(12) United States Patent
Zhang et al.

(10) Patent No.: US 6,262,905 B1
(45) Date of Patent: Jul. 17, 2001

(54) SECONDARY-SIDE CONTROLLED RESONANT AC VOLTAGE REGULATOR MODULE

(75) Inventors: Richard S. Zhang, Clifton Park; Robert Louis Steigerwald, Burnt Hills, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/442,324

(22) Filed: Nov. 22, 1999

(51) Int. Cl.$^7$ .................................................. H02M 7/217
(52) U.S. Cl. .......................................... 363/127; 323/225
(58) Field of Search ................................. 363/15, 16, 84, 363/89, 125, 127; 323/223–225

(56) References Cited

U.S. PATENT DOCUMENTS

| | | | |
|---|---|---|---|
| 4,870,555 | * | 9/1989 | White ........................................ 363/21 |
| 5,038,266 | * | 8/1991 | Callen et al. ........................... 363/127 |
| 5,179,512 | * | 1/1993 | Fisher et al. ........................... 363/127 |
| 5,570,276 | * | 10/1996 | Cuk et al. ................................ 363/16 |
| 5,708,571 | * | 1/1998 | Shinada .................................... 363/16 |
| 5,991,167 | * | 11/1999 | Van Lerberghe ........................ 363/16 |
| 5,999,420 | * | 12/1999 | Aonuma et al. ......................... 363/21 |

OTHER PUBLICATIONS

"Component Development for a High–Frequency AC Distributed Power System," R. Watson, W. Chen, G. Hua, FC Lee; Applied Power Electronics Conference and Exposition, 1996, APEC, 1996, Conference Proceedings, 1996, Eleventh Annual, pp. 657–663.

"Development of a Regulated Resonant Rectifier for AC Distributed Power Systems," W. Chen, R. Watson, G. Hua, FC Lee; Proceedings of the $12^{th}$ VPEC Power Electronics Seminar, 1994, pp. 259–265.

* cited by examiner

Primary Examiner—Peter S. Wong
Assistant Examiner—Gary L. Laxton
(74) Attorney, Agent, or Firm—Jill M. Breedlove; Douglas E. Stoner

(57) ABSTRACT

A secondary-side controlled series resonant AC voltage controlled module (VRM) converts an AC distribution bus voltage to a low DC voltage for providing power to high speed microprocessors and integrated circuits, with minimal conduction and switching losses, providing high efficiency even at low output voltage, high current and high switching frequency.

13 Claims, 10 Drawing Sheets

SECONDARY-SIDE CONTROLLED RESONANT AC VOLTAGE REGULATOR MODULE

BACKGROUND OF THE INVENTION

The present invention relates generally to voltage regulation in distributed power systems and, more particularly, to an AC voltage regulator module suitable for converting AC distribution bus voltage to low DC voltage.

An AC voltage regulator module (VRM) is an on-board power module in an AC distributed power system such as for computers, servers, and other electronic systems. An AC VRM performs two functions: (1) rectification, i.e., conversion of high-frequency AC bus voltage to DC output voltage, and (2) regulation, i.e., tight control of the amount of energy transferred to the load so that the output voltage is regulated regardless of load conditions.

Series resonant type circuits have been proposed as AC VRM's. In particular, regulated resonant rectifiers use a center-tapped transformer followed by a pair of rectifiers, e.g., synchronous rectifiers. Output regulation is achieved by using a variable resonant inductor, or a variable resonant capacitor (e.g., implemented by a switched capacitor), or phase angle controls (e.g., by using a shunt switch across the transformer primary or secondary side). Disadvantages resulting from separation of the rectification and regulation functions include complicated control, too many semiconductor devices, and relatively low efficiency.

Another approach is a primary-side controlled AC VRM wherein an AC switch on the primary side regulates the output voltage by controlling its conduction time. Synchronous rectification is provided by separate FET switches on the secondary side. Shortcomings include relatively high conduction losses due to the voltage drops across both the AC switch on the primary side and the synchronous rectifier on the secondary side, thus resulting in low efficiency.

Design issues for AC VRM's are high-efficiency, high current slew rate, fast control loop and simple topology. In particular, the speed of microprocessors and integrated circuits (IC's) continues to increase, accompanied by a decrease in supply voltage level. For example, DC supply voltage levels of 2.2V, 1.8V, and even voltages below 1V are in demand for next-generation microprocessors and IC's. The reduced output voltage level imposes great challenges on efficiency due in large part to the voltage drop in the rectification stage.

Accordingly, it is desirable to provide a high-efficiency AC VRM, even at low output voltage, high current and high switching frequency. It is also desirable to provide an AC VRM that combines the functions of rectification and regulation into one power conversion stage, thereby reducing conduction losses. It is furthermore desirable to provide an AC VRM that provides soft-switching operation to reduce switching losses.

BRIEF SUMMARY OF THE INVENTION

An exemplary embodiment of an AC voltage regulator module (AC VRM) in accordance with the present invention comprises a secondary-side controlled series resonant AC VRM, comprising a series resonant tank circuit, an isolation transformer, and a pair of AC switches for performing voltage rectification and regulation functions. The AC switches are alternately turned on according to the polarity of the AC bus voltage; and the turn-on instants of the AC switches are controlled by a voltage control loop to achieve the desired regulated output voltage. After the delayed turn-on instant for each respective switch, current through the resonant tank circuit starts to rise from zero, and the resonant tank circuit starts to resonate. When the AC bus voltage changes polarity, the current decreases rapidly to zero. Upon detection of the zero current crossing, the switch is turned off. As a result, conduction and switching losses are minimized, providing high efficiency even at low output voltage, high current and high switching frequency.

In another aspect of the present invention, a dual-device AC switch is provided for use in AC VRM topologies. The dual-device AC switch ensures soft-switching for all power switches and avoids stringent control timing requirements by allowing natural circuit action to turn devices on and off.

DETAILED DESCRIPTION OF THE INVENTION

Figure 1:
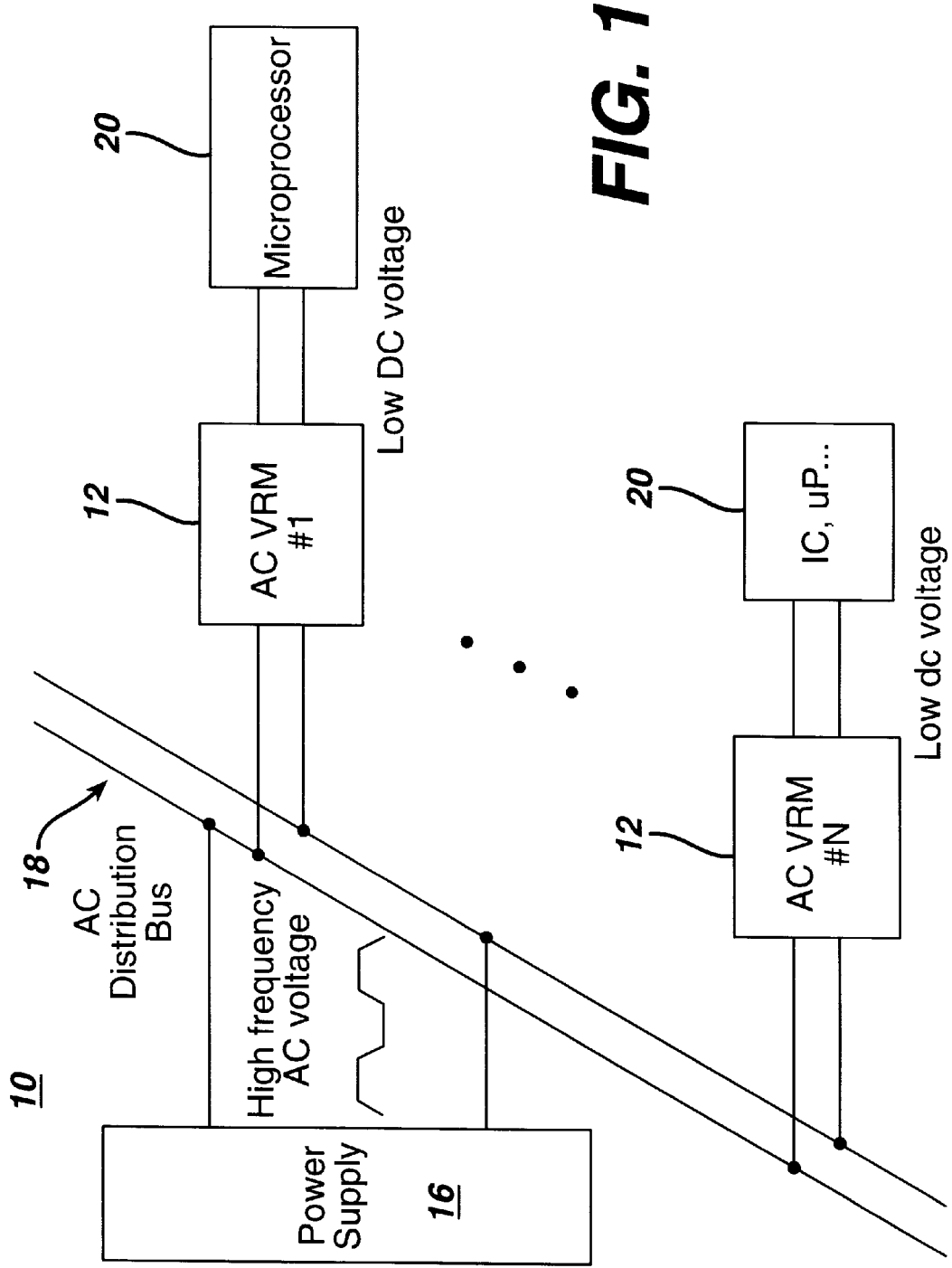
FIG. 1 is a block diagram illustrating an AC distribution system employing AC VRM's.

FIG. 1 illustrates an exemplary AC distributed power system 10 comprising AC VRM's numbered 1 through N. Generally, in FIG. 1, each AC VRM is represented herein by the numeral 12. As shown in FIG. 1, high-frequency AC voltage is provided via a power supply 16 to an AC distribution bus 18. The AC VRM's comprise on-board power modules that perform the rectification and regulation functions described hereinabove. Output signals from the AC VRM's are shown as inputs to microprocessors or IC's 20.

Although embodiments of the present invention are described herein with particular reference to a series resonant AC VRM, those of ordinary skill in the art will appreciate that other resonant circuit configurations are possible, such as, for example, parallel resonant or combination series-parallel resonant circuits.

Figure 2:
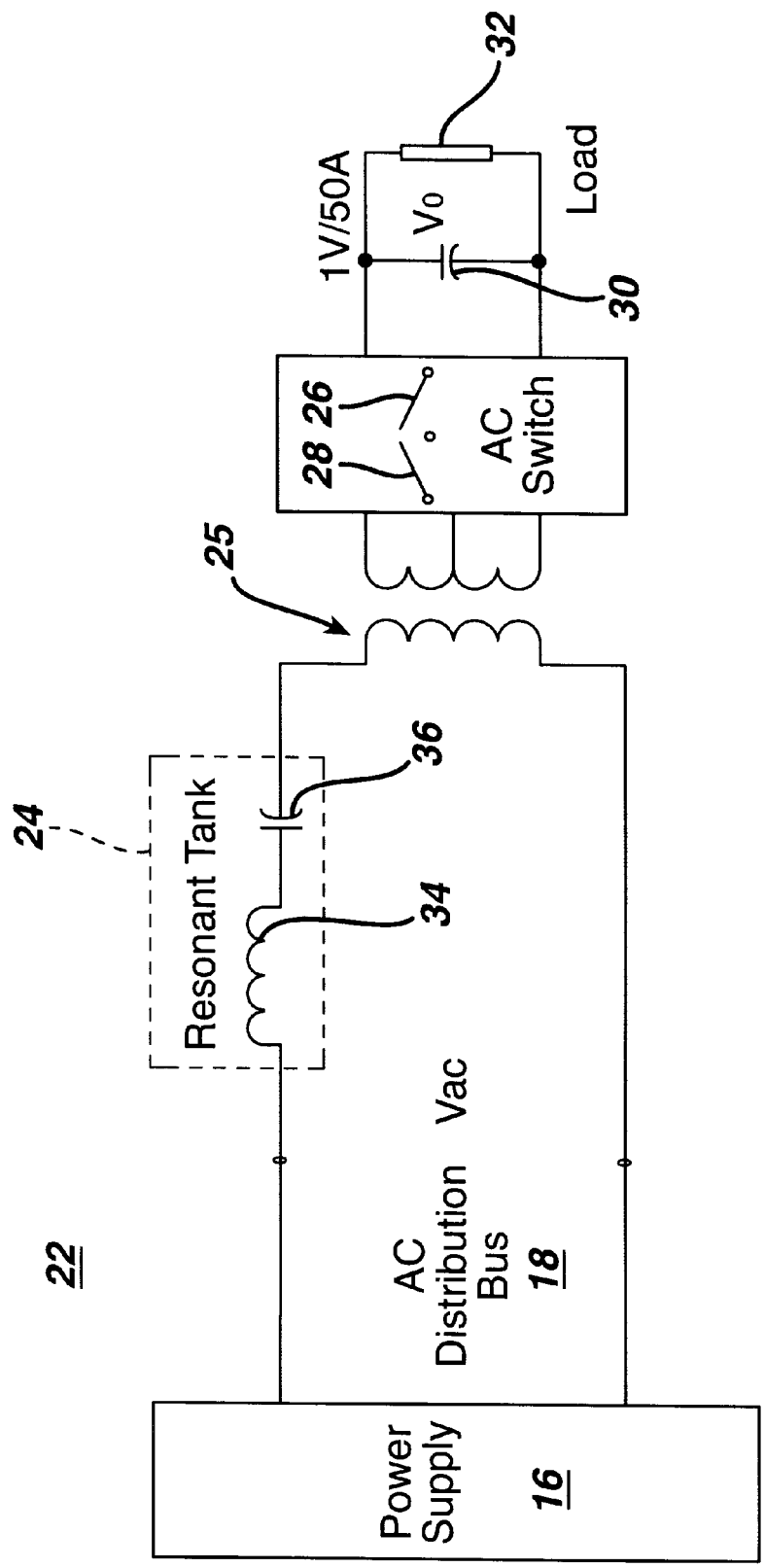
FIG. 2 is a block diagram illustrating an exemplary embodiment of secondary-side controlled series resonant AC VRM in accordance with the present invention.

FIG. 2 illustrates a secondary-side controlled series resonant AC VRM 22 in accordance with an exemplary embodiment of the present invention. AC VRM 22 comprises a series resonant tank circuit 24, an isolation transformer 25, AC (or bi-directional) switches 26 and 28 that perform both the voltage rectification and regulation functions, and an output capacitance 30. A load is indicated by the reference numeral 32. The resonant tank circuit comprises a resonant inductance 34 and a resonant capacitance 36.

Figure 3:
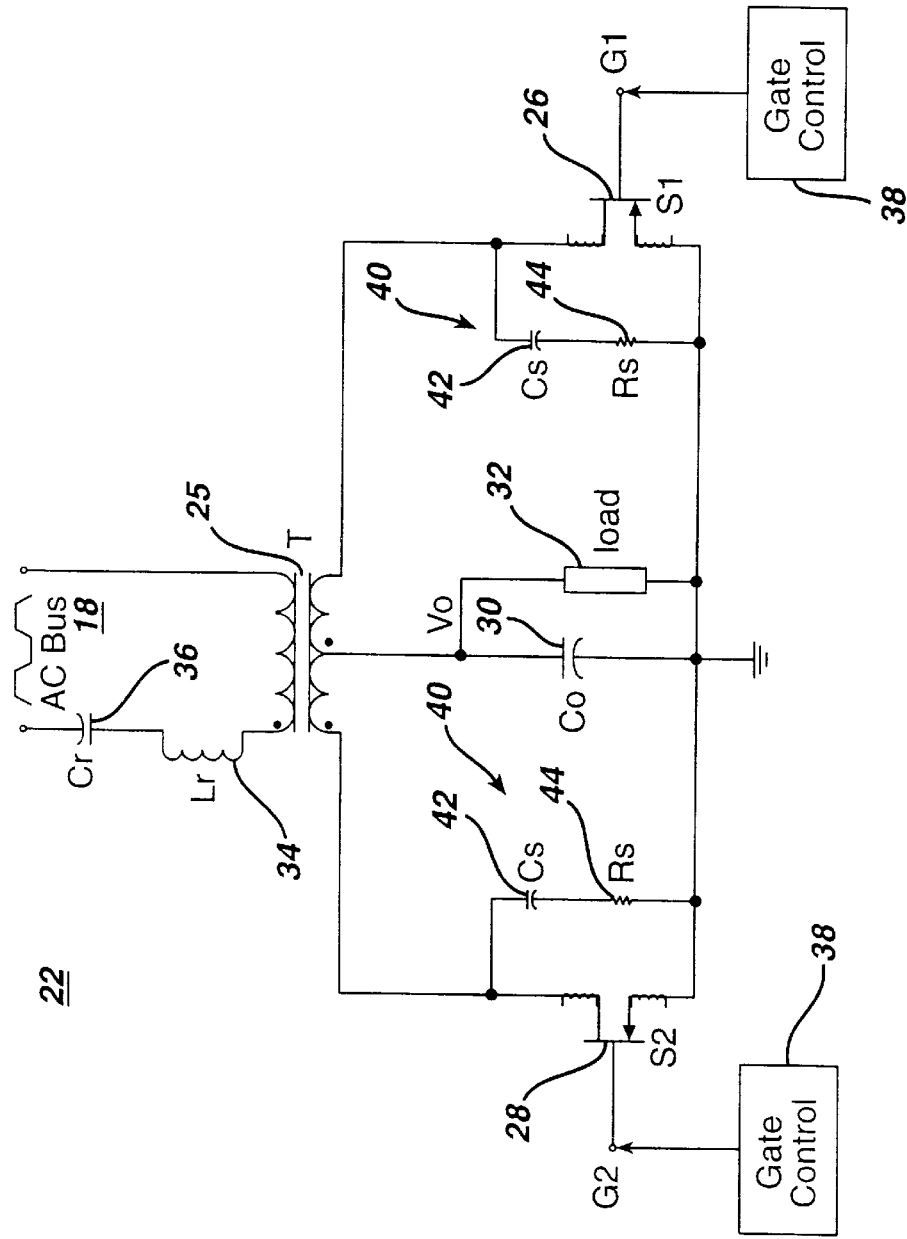
FIG. 3 schematically illustrates an exemplary circuit topology for the system of FIG. 2.

FIG. 3 schematically illustrates an exemplary embodiment of the circuit topology of AC VRM 22 of FIG. 3. The turn-on instants are determined by gate control circuitry 38. AC switches 26 (S1) and 28 (S2) are illustrated as comprising complementary hetero junction field effect transistors (CHFET's) developed by Honeywell Inc. which can symmetrically block voltage and conduct current. The lateral structure of a CHFET advantageously results in a low parasitic capacitance for the AC VRM; therefore, less gate charge is required to turn on and turn off the device, which is particularly useful for high frequency operation. Other suitable types of devices for implementing the AC switches include back-to-back connected power switches (e.g., MOSFET's or IGBT's), and lateral power MOSFET's and IGBT's.

For the circuit of FIG. 3, the resonant frequency of the series resonant tank circuit is designed to be slightly lower than the frequency of the AC distribution bus so that there is no current zero-crossing before the AC bus voltage polarity change. As another design consideration, the leakage inductance of the isolation transformer may comprise part of the resonant inductance. In addition, FIG. 3 illustrates snubber circuits 40, each comprising a resistance 42 and a capacitance 44.

Figure 4:
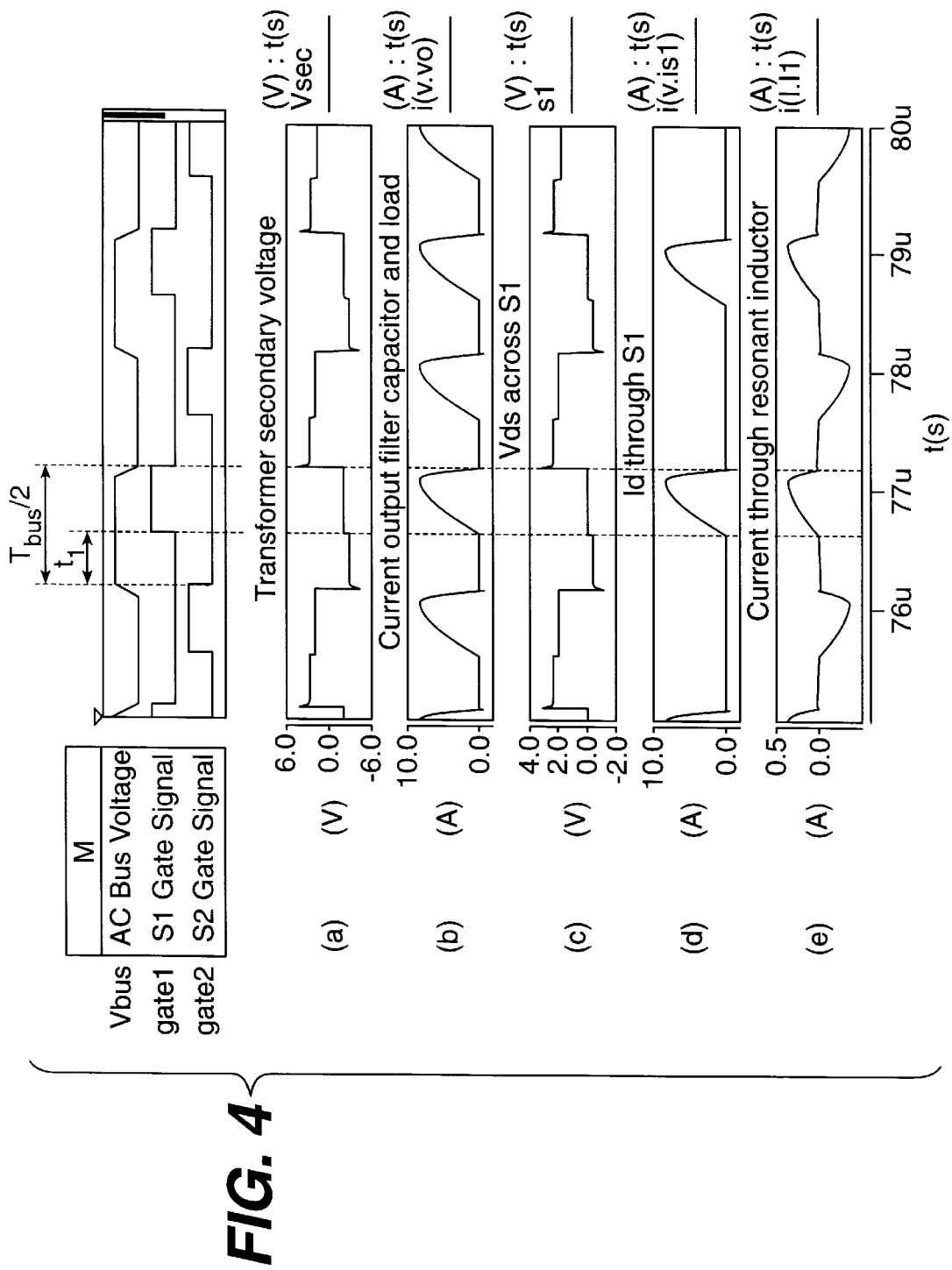
FIG. 4 graphically illustrates operation of the circuit of FIG. 3 with no control timing delay.

FIG. 4 provides waveforms illustrating ideal control timing (i.e., having no propagation delay and no current zero-crossing detection delay) for the AC VRM of FIG. 3. Propagation delay refers to the propagation delay of gate control circuits and the power switch turn-off delay, e.g., the time between the moment when the gate control issues a turn-off signal and the moment when the AC switch is turned off. Current zero-crossing detection delay refers to the response time a current zero-crossing detection circuit may have.

For the particular example of FIG. 4, which is provided by way of illustration only, the voltage of the AC distribution bus has a 300 kHz trapezoidal waveform and a magnitude of 30V. FIG. 4 illustrates the following waveforms: (a) the transformer secondary voltage, (b) the current to the output capacitor and load, (c) the drain-to-source voltage across switch 26 (S1), (d) the drain current through S1, and (e) the current through inductance 34. In operation, AC switches 26 and 28 are alternately turned on according to the polarity of the AC bus voltage. The turn-on instants of the AC switches are delayed and controlled by the voltage control loop to achieve the targeted output voltage. After the delayed turn-on instant for each respective switch, current through the resonant tank, and hence through the switch, starts to rise from zero. The resonant tank starts to resonate. When the AC bus voltage reverses polarity, the current decreases rapidly to zero. The AC switch is turned off upon detection of zero crossing of the switch current. Switching losses are negligible under ideal conditions due to zero current turn-on and turn-off. The result is high efficiency operation.

In practice, there are two basic issues with the ideal topology described hereinabove. First, it is not easy in many applications to detect accurately the zero crossing point of the switch current. Second, control and gate drive delays may cause relatively large circulating current because of the reversed AC bus voltage polarity at the turn-off instants. The impact of the turn-off propagation time delay is demonstrated in FIG. 5 wherein a gate timing delay of 100 ns is illustrated by way of example. For this example, FIG. 5 graphically illustrates (a) the drain-to-source voltage for switch S1, (b) the drain current through S1, (c) the current to the output capacitor and load, and (d) the current through resonant inductor 34. As illustrated, as energy transfers from the output capacitor back to the AC bus during the propagation timing delay at turn off of the AC switches, a large circulating current 46 results. For typical gate timing delays of greater than 100 ns, the circulating energy problem would be even more severe.

Figure 5:
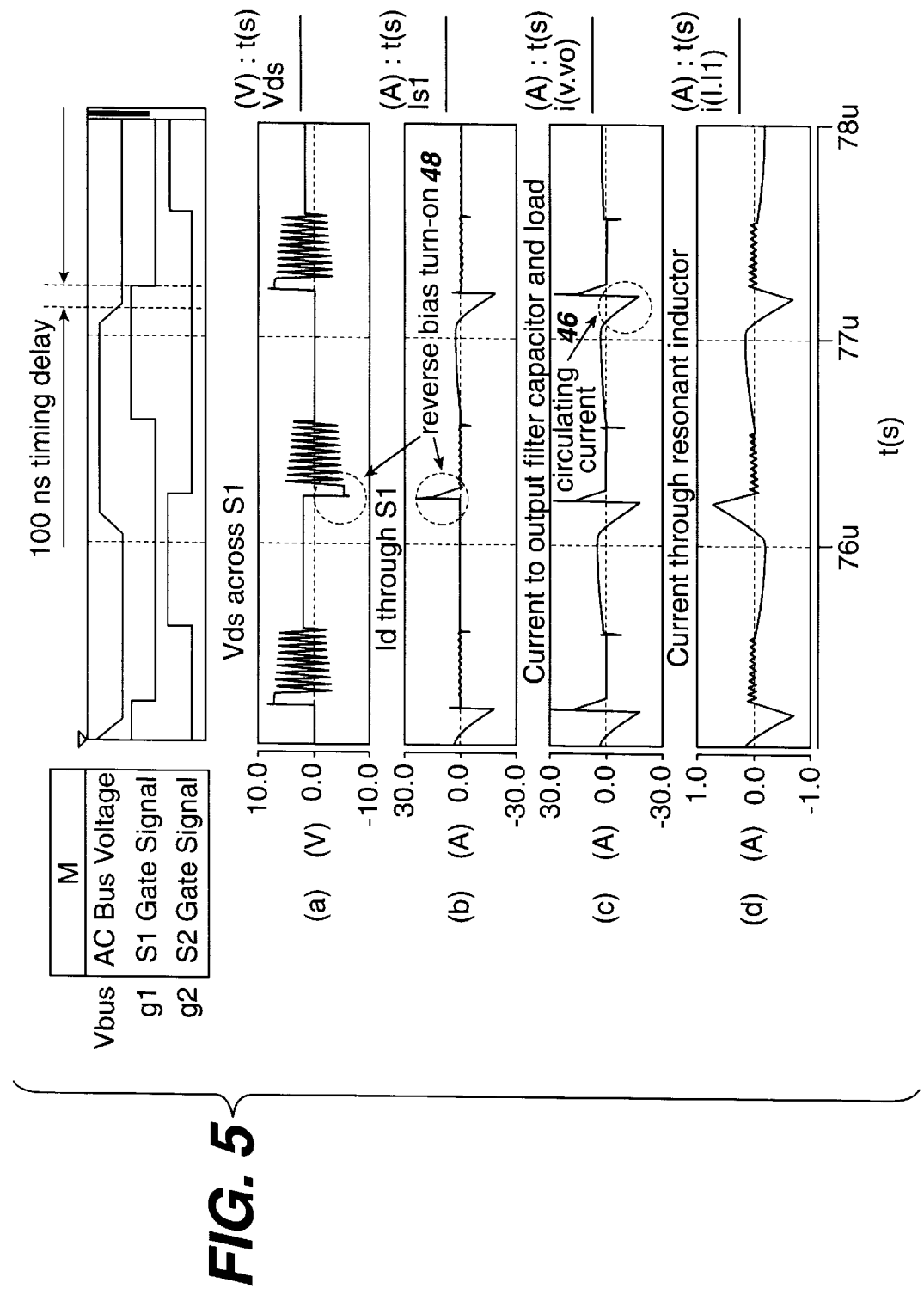
FIG. 5 graphically illustrates operation of the circuit of FIG. 3 with a 100 ns gate timing delay at turn-off.

FIG. 5 also illustrates reverse bias turn-on 48 of the AC switches. If lateral devices such as a CHFET's are used as the AC switches, then the switches could be turned on inadvertently when the respective gate-to-drain voltage $V_{gd}$ is larger than the turn-on threshold voltage $V_{th}$ for the respective switch. Therefore, the large voltage spike on one AC switch at turn-off may drive the other AC switch to be turned on under reverse bias conditions. In order to prevent reverse bias turn on, the voltage spike across the AC switch at turn off should be kept below $2V_o - V_{gs(-)} + V_{th}$; where $V_o$ is the output voltage and $V_{gs(-)}$ is the negative gate drive voltage. This can be achieved by limiting the AC switch turn-off voltage spike and/or increasing the negative gate drive voltage $V_{gs(-)}$.

Figure 6:
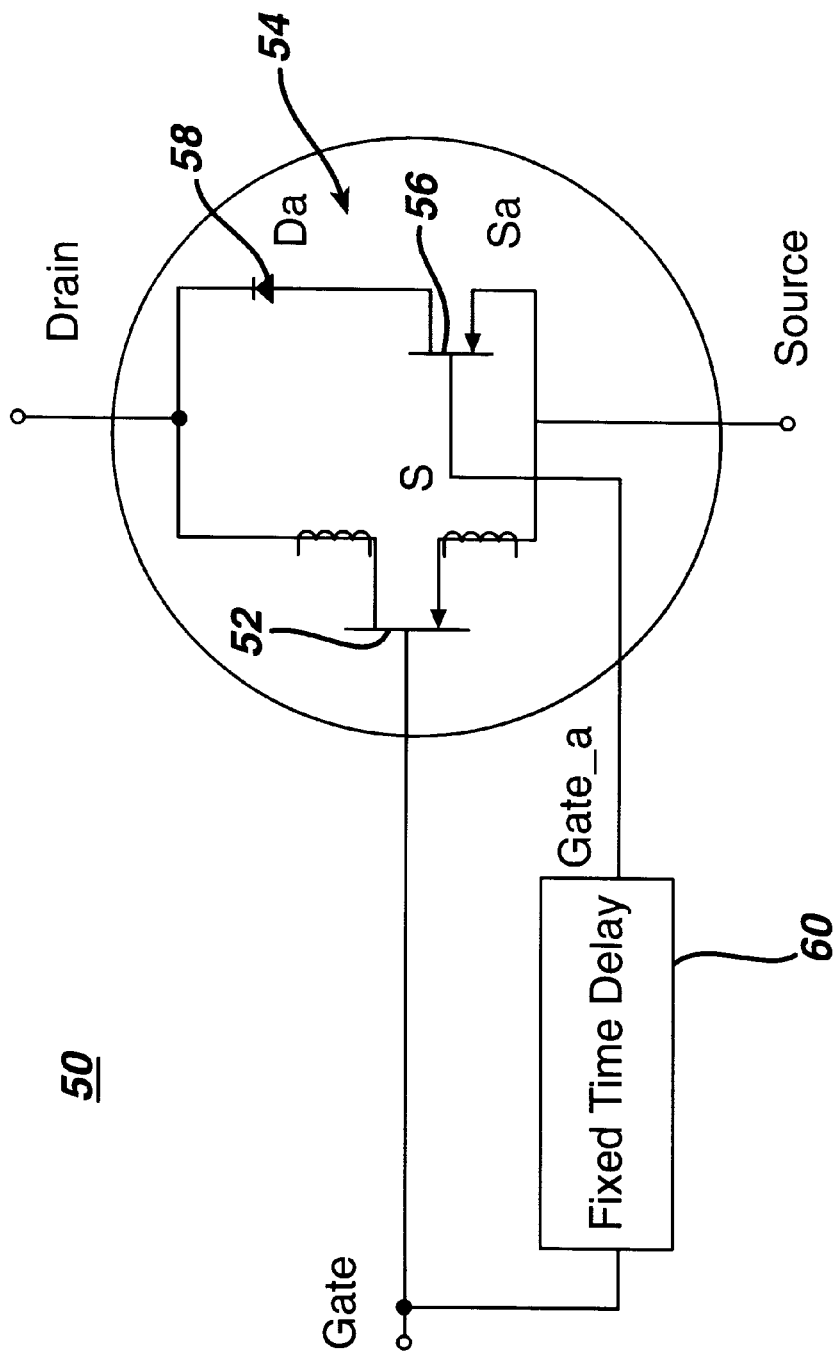
FIG. 6 illustrates a dual-device switch configuration useful in an AC VRM in accordance with the present invention.

FIG. 6 illustrates an alternative embodiment of an AC switch 50, referred to herein as a dual-device switch, useful in an AC VRM which avoids stringent timing requirements and ensures soft-switching for all power switches. Dual-device switch 50 comprises a main switch 52 (such as a CHFET) and an auxiliary branch 54, comprising an auxiliary switch 56 and an auxiliary diode 58 (such as a Schottky diode). The gate signal of the auxiliary switch is derived from that of the main switch after a fixed time delay 60. The auxiliary branch only conducts a small current in a small fi-action of the switching period, such that the current ratings of both the auxiliary diode and switch are significantly less than that of the main switch, e.g., less than one-tenth.

Figure 7:
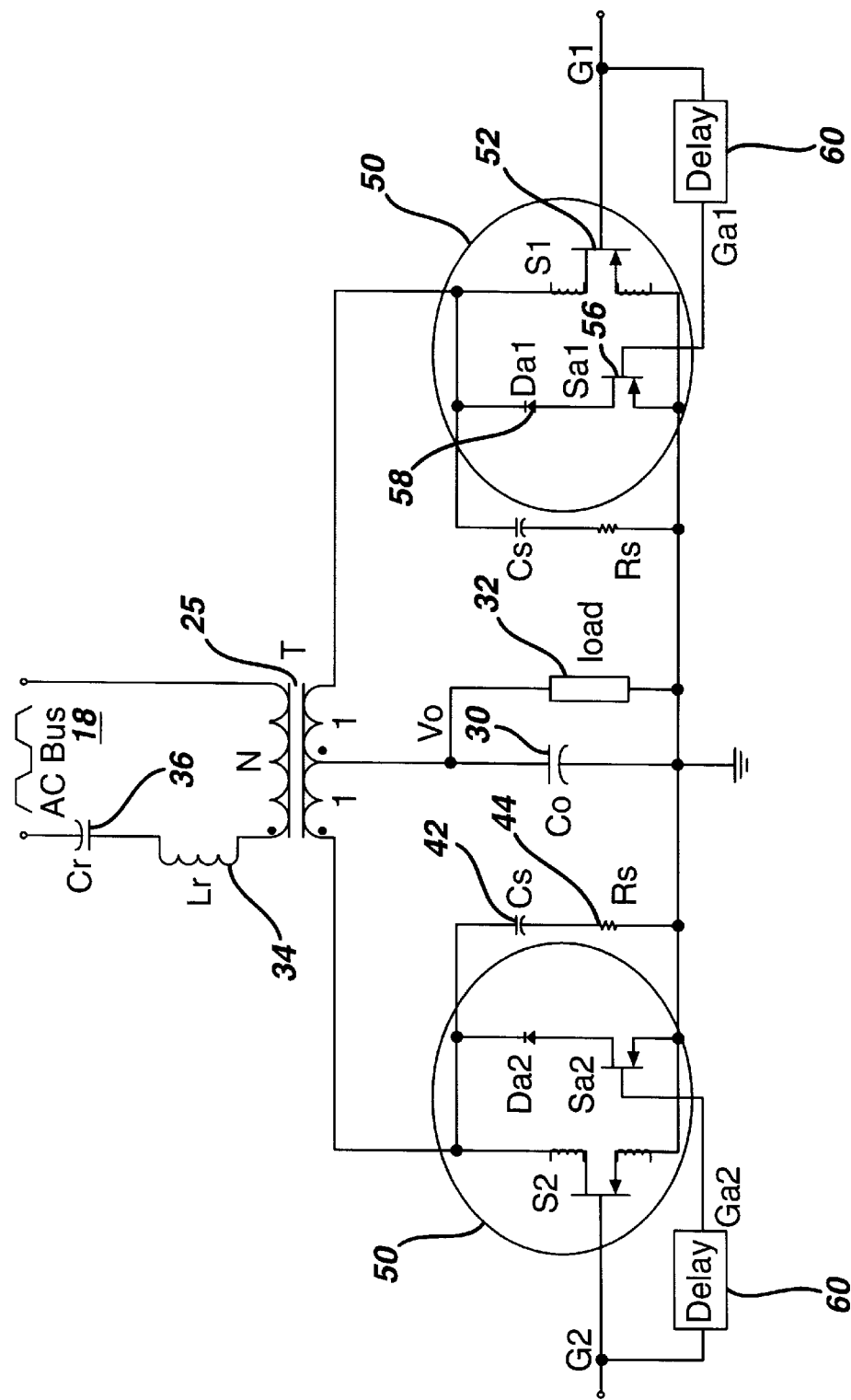
FIG. 7 schematically illustrates an exemplary embodiment of a secondary-side controlled series resonant AC VRM utilizing dual-device switches such as those of FIG. 6.
Figure 8:
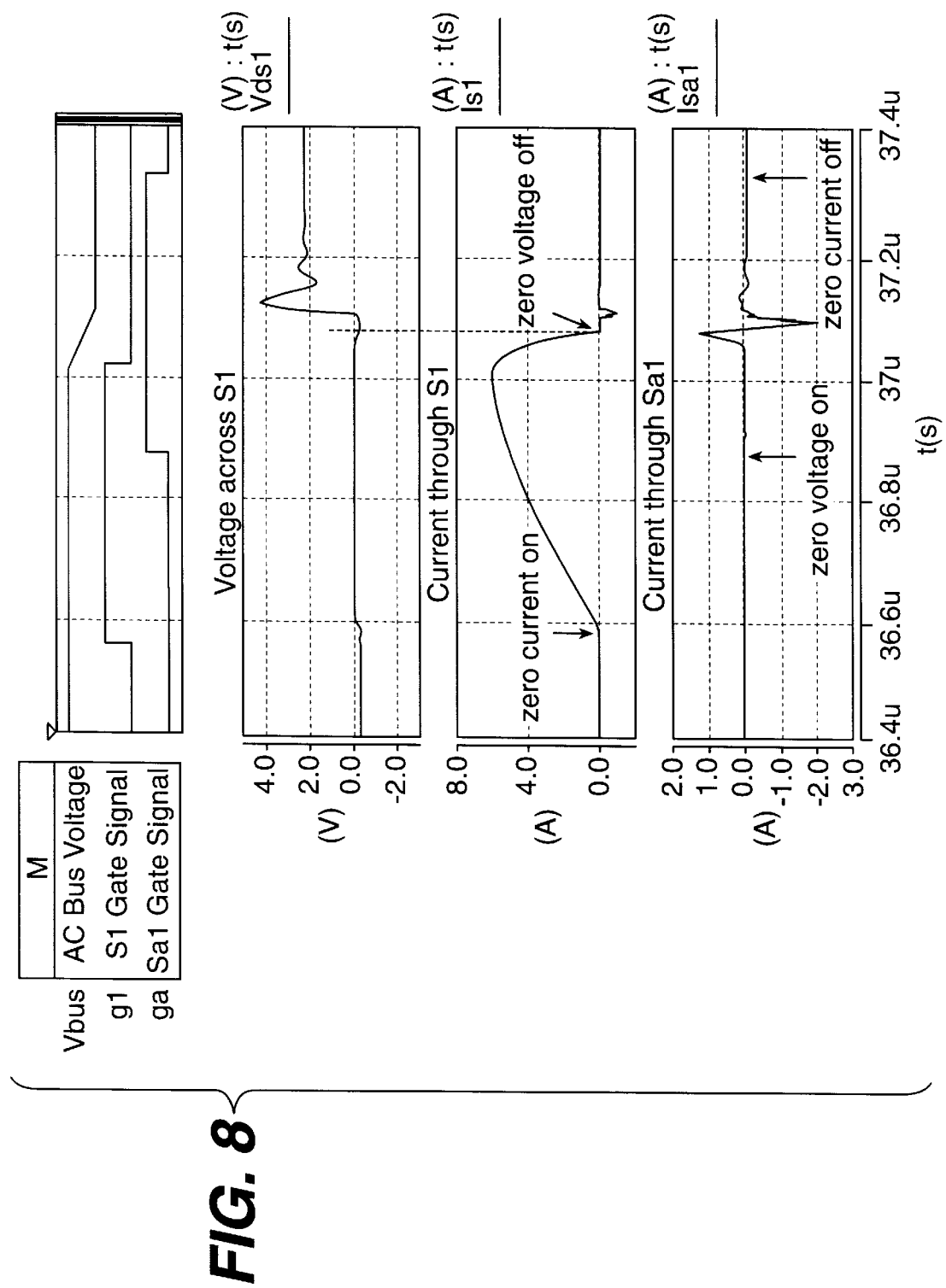
FIG. 8 graphically illustrates operation of the circuit of FIG. 7.

FIG. 7 illustrates an exemplary AC VRM circuit topology utilizing the dual-device switch of FIG. 6. FIG. 8 illustrates operational waveforms for the AC VRM of FIG. 7. In particular, FIG. 8 shows the voltage across a main switch (S1), current through the main switch (S1), and current through the associated auxiliary switch (Sa1).

In operation of the AC VRM of FIG. 7, a main switch (e.g., S1) is turned on with the controlled time delay 60 with respect to the rising or falling edge of the AC bus voltage. The main switch turns on at zero current, and the main switch current builds up therefrom. After the fixed delay time 60, as determined by the minimum duty cycle, the auxiliary switch Sa1 is turned on at zero voltage. Since the drain-to-source voltage at turn on of the main switch is much smaller than that of the auxiliary switch, almost all the current flows through the main switch. Immediately prior to the change in polarity of the AC bus voltage, the main switch S1 is turned off at zero voltage. Then, the current is diverted to the auxiliary branch and starts to decrease to zero. Due to the polarity change of the AC bus voltage, the current decreases rapidly. The diode reverse recovery will drive the current negative and then back to zero. Once the diode starts to block the voltage, the auxiliary branch stays off. At any time after the diode blocks the voltage, the auxiliary switch can be turned off at zero current.

When a dual-device switch 50 as described hereinabove is turned off (after the auxiliary diode 58 turns off), the secondary side is isolated from the primary side. The residual energy in the transformer and the resonant tank causes resonance between the resonant tank on the primary side and the snubber circuit and AC switch parasitic capacitors on the secondary side. A high voltage spike at turn-off may appear across the respective AC switch being turned off. Due to the coupling between the secondary windings, this high voltage spike yields a high reverse bias voltage across the other AC switch. If the turn-off voltage spike on S1 is greater than $2V_o-V_{gs(-)}+V_{th}$, then the reverse bias voltage across S2 will be greater than $V_{th}-V_{gs(-)}$. As a result, the gate-to-drain voltage $V_{gd}$ on switch S2 will be greater than its threshold voltage $V_{th}$ such that switch S2 will be turned on adversely. To eliminate this reverse bias turn-on problem, the AC switch turn-off voltage spike needs to be limited.

Figure 9:
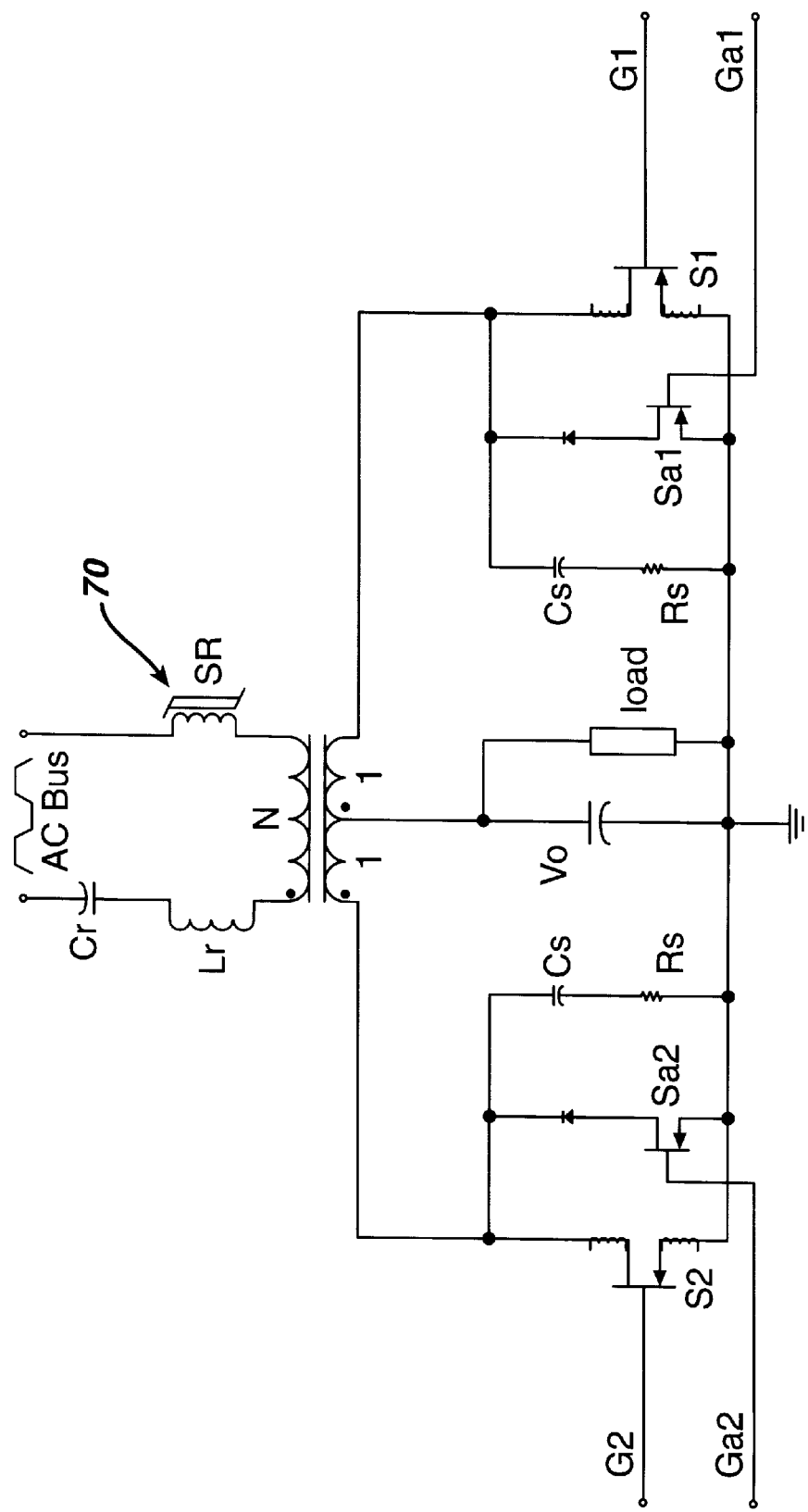
FIG. 9 schematically illustrates another exemplary embodiment of a secondary-side controlled series resonant AC VRM utilizing a saturable reactor for clamping voltage.

FIG. 9 illustrates one solution to the reverse bias problem. In particular, FIG. 9 illustrates using a saturable reactor 70 on the primary side. By designing the saturable reactor to block the current path for a few hundred nanoseconds, for example, the saturable core behaves like a switch which cuts off the resonant path between the primary and secondary sides after the AC switch turns off. In this way, the turn-off voltage spike is effectively limited.

Figure 10:
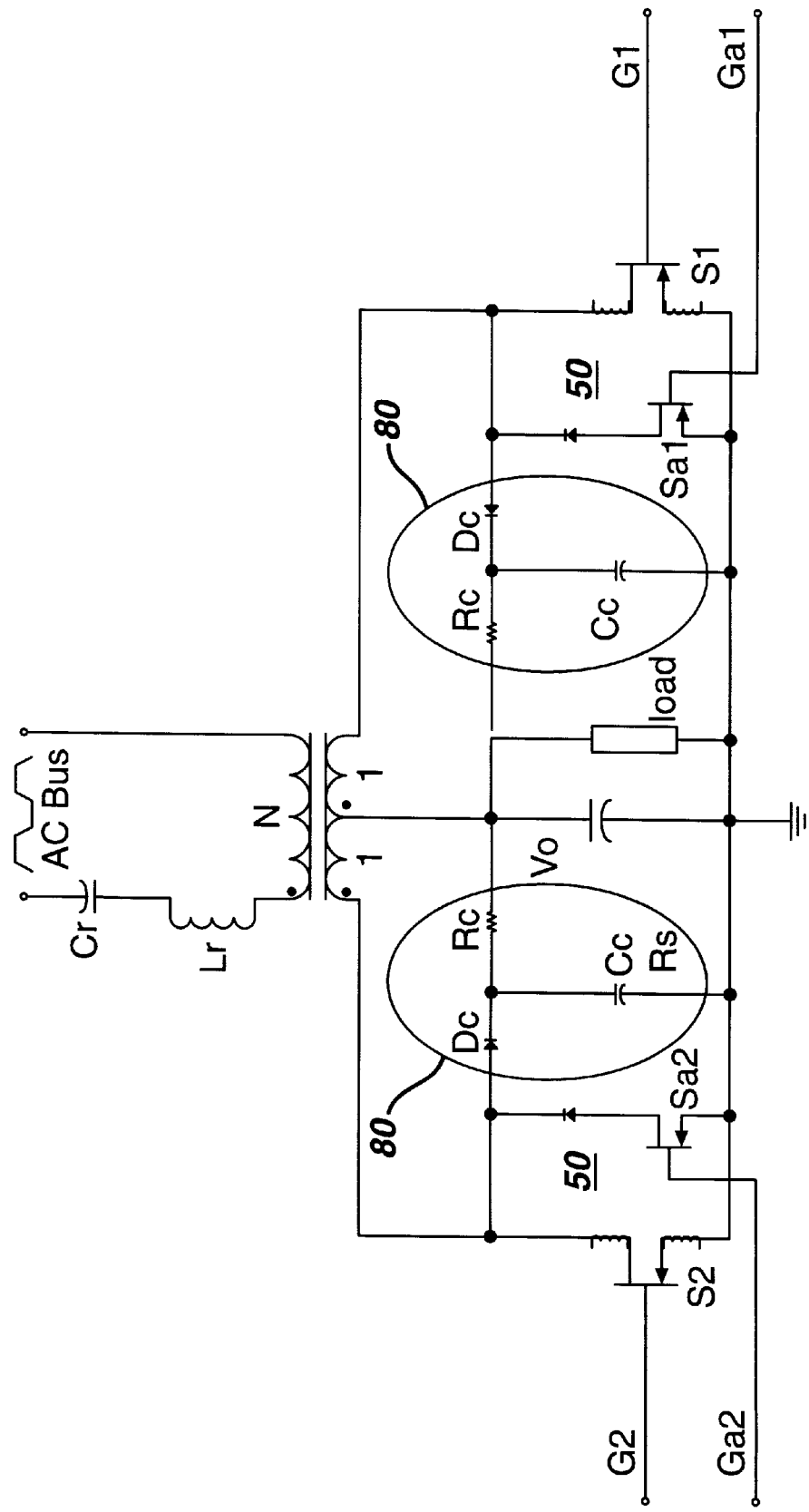
FIG. 10 schematically illustrates another exemplary embodiment of a secondary-side controlled series resonant AC VRM utilizing an RCD voltage clamp.

FIG. 10 illustrates another solution using a resistor-capacitor-diode (RCD) voltage clamp circuit 80 around each dual-device switch 50. Power loss is much less using the RCD voltage clamp circuit than using an RC snubber circuit such that this is an attractive and practicable solution for many applications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An AC voltage regulator module (VRM) for converting an AC distribution bus voltage to a regulated DC voltage, comprising:
   a resonant tank circuit for coupling the AC VRM to the AC distribution bus;
   a secondary-side power conversion stage coupled to the resonant tank circuit via an isolation transformer, the power conversion stage comprising a pair of bi-directional switches coupled to the resonant tank circuit via the isolation transformer, the bi-directional switches rectifying the AC bus voltage and providing the regulated DC voltage, each bi-directional switch comprising a dual-device switch comprising a main switch coupled to an auxiliary branch, the auxiliary branch comprising an auxiliary switch coupled in series with a diode, the dual-device switch further comprising a fixed delay circuit for providing a fixed delay between turn on and turn off of the main switch and the auxiliary switch; and
   a secondary-side control for alternately turning on and off the bi-directional switches based on the polarity of the AC bus voltage and based on controlled timing in order to minimize switching and conduction losses and to provide the regulated DC voltage.

2. The AC VRM of claim 1 wherein the resonant tank circuit comprises a series resonant tank circuit.

3. The AC VRM of claim 1, further comprising means for limiting a voltage across each respective bi-directional switch at turn-off in order to avoid a reverse bias turn-on of the other AC switch.

4. The AC VRM of claim 3, wherein the means for limiting a voltage across each respective bi-directional switch comprises a saturable reactor on the primary side of the isolation transformer for removing the path between the primary and secondary sides of the isolation transformer after each respective AC bi-directional switch turns off.

5. The AC VRM of claim 3 wherein the means for limiting a voltage across each respective bi-directional switch comprises a resistor-capacitor-diode voltage clamp circuit coupled to each AC switch.

6. The AC VRM of claim 1 wherein the gate controller comprises means for increasing the negative gate drive voltage to each respective AC bi-directional switch at turn-off in order to avoid a reverse bias turn-on of the other bi-directional switch.

7. An AC voltage regulator module (VRM) for converting an AC distribution bus voltage to a regulated DC voltage, comprising:
   a series resonant tank circuit for coupling the AC VRM to the AC distribution bus;
   a secondary-side power conversion stage coupled to the resonant tank circuit via an isolation transformer, the power conversion stage comprising a pair of AC switches coupled to the resonant tank circuit via an isolation transformer, the AC switches rectifying the AC bus voltage and providing the regulated DC voltage, the AC switches each comprising a dual-device switch comprising a main switch coupled to an auxiliary branch, the auxiliary branch comprising an auxiliary switch coupled in series with a diode, each dual-device switch further comprising a fixed delay circuit for providing a fixed delay between turn on and turn off of the main switch and the auxiliary switch; and
   a gate controller for alternately turning on and off the AC switches based on the polarity of the AC bus voltage and based on controlled timing in order to minimize switching and conduction losses and to provide the regulated DC voltage.

8. The AC VRM of claim 7 wherein each AC switch comprises a CHFET.

9. The AC VRM of claim 7, further comprising a snubber circuit coupled to each AC switch.

10. The AC VRM of claim 7, further comprising means for limiting a voltage across each respective AC switch at turn-off in order to avoid a reverse bias turn-on of the other AC switch.

11. The AC VRM of claim 7 wherein the means for limiting a voltage across each respective AC switch comprises a saturable reactor on the primary side of the isolation transformer for removing the path between the primary and secondary sides of the isolation transformer after each respective AC switch turns off.

12. The AC VRM of claim 11 wherein the means for limiting a voltage across each respective AC switch comprises a resistor-capacitor-diode voltage clamp circuit coupled to each AC switch.

13. The AC VRM of claim 11 wherein the gate controller further comprises means for increasing the negative gate drive voltage to each respective AC switch at turn-off in order to avoid a reverse bias turn-on of the other AC switch.

* * * * *